United States Patent [19]

Ridyard

[11] 4,145,340
[45] Mar. 20, 1979

[54] WATER-SOLUBLE REACTIVE MONOAZO DYE CONTAINING A NONYLPHENOXY, CHLOROTRIAZINE GROUP

[75] Inventor: Denis R. A. Ridyard, Manchester, England

[73] Assignee: Imperial Chemical Industries Limited, London, England

[21] Appl. No.: 764,989

[22] Filed: Feb. 2, 1977

Related U.S. Application Data

[63] Continuation of Ser. No. 678,356, Apr. 19, 1976, abandoned, which is a continuation of Ser. No. 583,403, Jun. 3, 1975, abandoned, which is a continuation of Ser. No. 437,388, Jan. 28, 1974, abandoned.

[30] Foreign Application Priority Data

Jan. 30, 1973 [GB] United Kingdom ............. 4579/73

[51] Int. Cl.$^2$ ............. C09B 62/08; D06P 1/382; D06P 3/10; D06P 3/66
[52] U.S. Cl. ............. 260/153; 260/154; 260/163; 260/196; 260/198; 260/199; 260/205
[58] Field of Search ............. 260/153, 154, 146 D, 260/146 T

[56] References Cited

U.S. PATENT DOCUMENTS

| | | | |
|---|---|---|---|
| 2,795,576 | 6/1957 | Fasciati ............. | 260/153 |
| 2,891,941 | 6/1959 | Fasciati et al. ............. | 260/153 |
| 2,964,520 | 12/1960 | Baker et al. ............. | 260/153 |
| 2,979,498 | 4/1961 | Andrew et al. ............. | 260/153 |
| 3,133,909 | 5/1964 | Riat ............. | 260/153 X |
| 3,135,731 | 6/1964 | Tilley et al. ............. | 260/153 |
| 3,462,410 | 8/1969 | Schneider ............. | 260/153 |
| 3,471,467 | 10/1969 | Wegmuller et al. ............. | 260/153 |
| 3,655,639 | 4/1972 | Riat et al. ............. | 260/153 |
| 3,663,526 | 5/1972 | Oesterlein et al. ............. | 260/153 |
| 3,709,869 | 1/1973 | Mazza ............. | 260/153 |

Primary Examiner—Floyd D. Higel
Attorney, Agent, or Firm—Cushman, Darby & Cushman

[57] ABSTRACT

A water-soluble azo dye having the general formula:

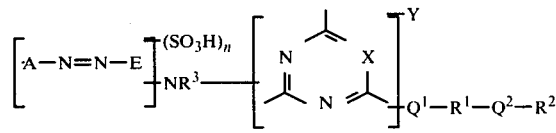

wherein A represents the residue of a diazo component of the benzene or naphthalene series; E represents the residue of a coupling component of the arylamine, naphthol, phenol, 5-pyrazolone, 5-aminopyrazole or acylacetarylamide series; X represents =N—, =C—Cl or =C—CN; Y represents chlorine or bromine, $Q^1$ represents —O—, —S— or —$NR^4$— in which $R^4$ represents hydrogen or lower alkyl; $Q^2$ represents a direct link, —O—, —S—, —CO—, —$SO_2$—, —$SO_2NH$—, —$NHSO_2$—, —CONH—, —NHCO—, —COO—, —OCO—, —$OSO_2$— or —$NR^5$— in which $R^5$ represents hydrogen or lower alkyl; $R^1$ represents an arylene radical; $R^2$ represents an optionally substituted alkyl, cycloalkyl, aralkyl or aryl radical such that $R^1$ and $R^2$ together contain from 14 to 18 carbon atoms; $R^3$ represents hydrogen or lower alkyl and n is a whole number having a value from 1 to 3.

These dyes are useful for coloring cellulosic textile materials as well as textile materials based on natural or synthetic nitrogenous fibers such as wool, silk and nylon.

1 Claim, No Drawings

WATER-SOLUBLE REACTIVE MONOAZO DYE CONTAINING A NONYLPHENOXY, CHLOROTRIAZINE GROUP

This is a continuation of application Ser. No. 678,356 filed Apr. 19, 1976, now abandoned which is a continuation of application Ser. No. 583,403 filed June 3, 1975, now abandoned, which is a continuation of application Ser. No. 437,388, filed Jan. 28, 1974, now abandoned.

This invention relates to azo dyes and more particularly to water-soluble azo dyes containing fibre-reactive groups which are particularly valuable for coloring polyamide textile materials.

According to the invention there are provided water-soluble azo dyes having the general formula:

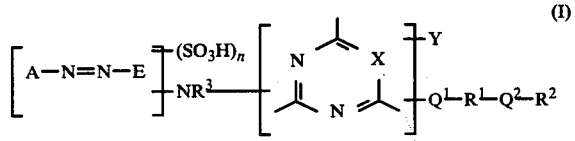
(I)

wherein A represents the residue of a diazo component of the benzene or naphthalene series; E represents the residue of a coupling component of the arylamine, naphthol, phenol, 5-pyrazolone, 5-aminopyrazole or acylacetarylamide series; X represents

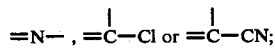

Y represents chlorine or bromine; $Q^1$ represents —O—, —S— or —NR$^4$— in which $R^4$ represents hydrogen or lower alkyl; $Q^2$ represents a direct link, —O—, —S—, —CO—, —SO$_2$—, —SO$_2$NH—, —NHSO$_2$—, —CONH—, —NHCO—, —COO—, —OCO—, —OSO$_2$— or —NR$^5$— in which $R^5$ represents hydrogen or lower alkyl; $R^1$ represents an arylene radical; $R^2$ represents an optionally substituted alkyl, cycloalkyl, aralkyl or aryl radical such that $R^1$ and $R^2$ together contain from 14 to 18 carbon atoms; $R^3$ represents hydrogen or lower alkyl and n is a whole number having a value from 1 to 3.

The radical represented by A may carry the usual substituents appropriate to diazo components. Examples of such substituents include sulphonic acid and carboxylic acid groups, chlorine, bromine, cyano, hydroxy, lower alkyl, lower alkoxy, trifluoromethyl, —NHCOR$^6$ where R$^6$ is an alkyl, aryl, alkoxy, aryloxy, alkylamino, arylamino or amino radical, —SO$_2$NR$^7$R$^8$ where R$^7$ is alkyl or aryl and R$^8$ is hydrogen or alkyl and —SO$_2$R$^9$ where R$^9$ is alkyl or aryl. Other substituents which may be carried by A include phenylazo and naphthylazo radicals which may themselves be substituted.

Throughout the specification the terms "lower alkyl" and "lower alkoxy" are used to denote alkyl and alkoxy radicals respectively containing from 1 to 4 carbon atoms.

The residue of the coupling component represented by E may be the residue of any coupling component (that is to say a compound which will react with a diazonium compound to form an azo dyestuff) of the phenol, naphthol, acylacetarylamide, arylamine, 5-aminopyrazole or 5-pyrazolone series. The coupling components of the acylacetarylamide series are preferably acetoacetanilides. The coupling components of the arylamine series may be primary, secondary or tertiary amines of the benzene series which couple in para position to a primary, secondary or tertiary amino group, or primary or secondary amines of the naphthalene series which couple in para or ortho position to the amino group. The coupling components of the 5-aminopyrazole series are preferably 1-aryl-5-aminopyrazoles in particular 1-phenyl-5-aminopyrazoles. The coupling components of the 5-pyrazolone series are preferably 1-aryl-5-pyrazolones in particular 1-phenyl-5-pyrazolones or 1-naphthyl-5-pyrazolones. If desired, the coupling components represented by E may contain substituents attached to aryl rings, in particular benzene or naphthalene rings, present in the said components; and as examples of such substituents there may be mentioned chlorine atoms, lower alkyl radicals, lower alkoxy radicals and nitro, cyano, lower alkylsulphone such as methylsulphone and ethyl sulphone, sulphonamide and substituted sulphonamide groups such as N-lower alkyl sulphonamide, N,N-di(lower alkyl)sulphonamide, N-(hydroxy lower alkyl)sulphonamide and N,N-di(hydroxy lower alkyl) sulphonamide groups, for example sulphon-N-methylamide, sulphon-N-ethylamide, sulphon-N-propylamide, sulphon-N-(β-hydroxyethyl)amide, sulphon-N,N-di(β-hydroxyethyl)amide, sulphon-N,N-dimethylamide, sulphon-N,N-diethylamide and sulphon-N,N-dipropylamide groups, acylamino groups such as acetylamino, propionylamino, benzoylamino, benzenesulphonylamino, p-toluenesulphonylamino, carbomethoxyamino, carboethoxyamine and carbopropoxyamino groups, primary amino groups, N-lower alkylamino groups, phenylamino groups, sulphonic acid groups, carboxylic acid groups, and arylazo groups in particular substituted or unsubstituted phenylazo or naphthylazo groups.

Preferably, R$^1$ is a phenylene radical and R$^2$ is an alkyl radical containing from 8 to 12 carbon atoms. In this case, Q$^1$ is preferably oxygen and Q$_2$ is preferably a direct link.

The dyes of Formula I may be prepared by reacting a compound of the formula:

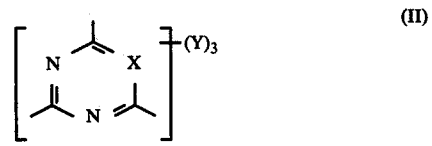
(II)

wherein X and Y have the meanings already stated, with, in either order, equimolecular proportions of an azo compound of the formula:

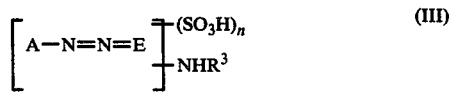
(III)

wherein A, E, R$^3$ and n have the meanings already stated and a compound of the formula:

$R^2$—$Q^2$—$R^1$—$Q^1$—H  (IV)

wherein R$^1$, R$^2$, Q$^1$ and Q$^2$ have the meanings already stated.

The dyes of Formula I may also be prepared by diazotizing an aromatic amine of the benzene or naphthalene series and coupling the diazo compound so obtained with a coupling component of the arylamine, naphthol, phenol, 5-pyrazolone, 5-aminopyrazole or acylacetarylamide series, the amine and the coupling component together containing n sulphonic acid groups and a group of the formula:

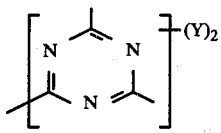

wherein X and Y have the meanings already stated, to form a dye of the formula:

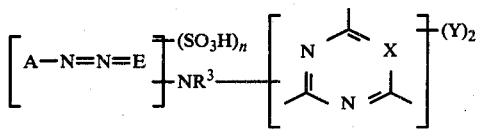

which is then reacted with a compound of Formula IV.

Suitable compounds of Formula II are cyanuric chloride, cyanuric bromide, 2,4,6-trichloropyrimidine, 2,4,6-tribromopyrimidine, 2,4,5,6-tetrachloropyrimidine and 2,4,6-trichloro-5-cyanopyrimidine.

Azo compounds of Formula III have been fully described in the prior art and may be prepared from diazotizable aromatic amines and coupling components in the usual way.

Examples of aromatic amines which may be used in the preparation of azo compounds of Formula III include aniline, o-, m- or p-toluidine, o-, m- or p-chloroaniline, o-, m- or p-bromoaniline, o-, m- or p-cyanoaniline, o-, m- or p-anisidine, 4- or 5-chloro -2-anisidine, 4- or 5-chloro-2-toluidine, 2-trifluoromethylaniline, 2-trifluoromethyl-4-chloroaniline, aniline-2-,3- or 4-sulphonic acid, aniline-2, 5-, 2,4- or 3,4-disulphonic acid, 2-aminophenol-4 or 6-sulphonic acid, 4- or 5-sulpho-2-aminobenzoic acid, 4-(or 6-) chloro-2-aminophenol-6- (or 4-) sulphonic acid, 2-aminophenol -4,6-disulphonic acid, 4-(acetylamino or methyl or methoxy) aniline-2-sulphonic acid, 1-naphthylamine-3-, 4-,5-, 6-, 7- or 8-sulphonic acid, 2-aminonaphthalene-1-, 5-, 6-, 7- or 8-sulphonic acid, 1-naphthylamine-2,7-, 3,6-, 3,8-, 4,6- or 4,7-disulphonic acid, 1-naphthylamine-3,6,8- or 2,5,7-trisulphonic acid, 2-naphthylamine-1,5-, 3,7-, 4,8-, 5,7- or 6,8-disulphonic acid, 2-naphthylamine-3,6,8-trisulphonic acid, 5-acetylaminoaniline-2-sulphonic acid, 2,5-dichloroaniline -4-sulphonic acid, aniline-5-sulphonanilide-2-sulphonic acid, 3-aminoacetanilide, 4- aminoacetanilide and 4-amino-4'-nitrostilbene-2,2'-disulphonic acid.

As examples of coupling components which may be used in the preparation of azo compounds of Formula III there may be mentioned phenols such as p-cresol, 4-acetylaminophenol, resorcinol, 1-hydroxycarbazole-3,6-disulphonic acid and 2-hydroxycarbazole-3,6,8-trisulphonic acid, naphthols such as 1-naphthol, 1-naphthol-2-, 4- or 5-sulphonic acid, 1-naphthol-3,6- or 3,8-disulphonic acid, 1-naphthol-3,6,8-trisulphonic acid, 2-naphthol, 2-naphthol-6-, 7- or 8-sulphonic acid, 2-naphthol-3,6- or 6,8-disulphonic acid, 1,8-dihydroxynaphthalene-3,6-disulphonic acid, 1-amino-8-naphthol-2,4-, -3,6- or 4,6-disulphonic acid and the N-lower alkyl, N-aryl and N-acyl derivatives thereof, 2-amino-8-naphthol-6-sulphonic acid and the N-lower alkyl, N-aryl and N-acyl derivatives thereof, 2-amino-5-naphthol-7-sulphonic acid and the N-lower alkyl, N-aryl and N-acyl derivatives thereof, 2-amino-8-naphthol-3,6-disulphonic acid, 2-amino-5-naphthol-1,7-disulphonic acid, 1-amino-8-naphthol-4-sulphonic acid, 1-amino-5-naphthol-7-sulphonic acid, N-(7-sulpho-5-hydroxynaphth-2-yl)piperazine and N-(6-sulpho-8-hydroxynaph-2-yl)-piperazine; arylamines for example N,N-dimethylaniline, N,N-diethyl-m-toluidine, m-toluidine, N:N-di($\beta$-hydroxyethyl)-m-toluidine, N-methyl-N($\beta$-sulphatoethyl)aniline, 1-naphthylamine-6- or 7-sulphonic acid, 2-methoxy-1-naphthylamine-6-sulphonic acid, 2-methylaminonaphthalene-7-sulphonic acid, 2-naphthylamine-6-, 7- or 8-sulphonic acid, 2-naphthylamine-3,7-, 4,8, 5,7- or 6,8-disulphonic acid and the N-lower alkyl, N-aryl and N-acyl derivatives thereof, 2-naphthylamino-5- or 6-sulphonamide and 1-naphthylamine-7-sulphonmethylamide; acylacetarylamides for example acetoacetanilide, acetoacetanilide-3- or 4-sulphonic acid, acetoacet-3- or 4-aminoanilide, acetoacet-o-m- or p-anisidide and acetoacet-o- or p-chloroanilide; 5-aminopyrazoles for example 1-phenyl-3-methyl-5-aminopyrazole; and 5-pyrazolones such as 1,3-dimethyl-5-pyrazolone, but more particularly 1-aryl-5-pyrazolones such as 1-phenyl-3-methyl-5-pyrazolone, 1-phenyl-3-carboxy-5-pyrazolone, 1-(2'-, 3'- or 4'-sulphophenyl)-3-methyl-5-pyrazolone, 1-(2'-chloro-5'-sulphophenyl)-3-methyl-5-pyrazolone, 1-(2',4'- or 2',5'-disulphophenyl)-3-methyl-5-pyrazolone, 1-(3'- or 4' acetylaminophenyl)-3-methyl-5-pyrazolone, 1-(3'- or 4'-acetylaminophenyl)-3-carboxy-5-pyrazolone, 1-(5'-hydroxy-7'-sulpho-2'-naphthyl)-3-methyl-5-pyrazolone, 1-(2'-chlorophenyl)-3-methyl-5-pyrazolone, 1-(2',5'-dichloro-4'-sulphophenyl)-3-methyl-5-pyrazolone, 1-(8'-hydroxy-6'-sulpho-2'-naphthyl)-3-methyl-5-pyrazolone 1-(2'-,3'- or 4'-sulphophenyl)-3-carboxy-5-pyrazolone, 1-(4'-aminophenyl)-3-carboxy-5-pyrazolone, 1-(4'-amino-3'-sulphophenyl)-3-carboxy-5-pyrazolone, 1-(3'-aminophenyl)-3-carboxy-5-pyrazolone, 1-(3'-amino-4'-sulphophenyl)-3-carboxy-5-pyrazolone, 1-(4'-aminophenyl)-3-methyl-5-pyrazolone, 1-(3'-aminophenyl)-3-methyl-5-pyrazolone, 1-(4'-amino-3'-sulphophenyl)-3-methyl-5-pyrazolone and 1-(3'-amino-4'-sulphophenyl)-3-methyl-5-pyrazolone.

Suitable compounds of Formula IV include alkylphenols, for example p-octylphenol, p-nonylphenol and p-dodecylphenol; alkoxyphenols, for example hydroquinone and resorcinol monoalkyl ethers where the alkyl residue may be octyl, nonyl, decyl, and dodecyl; thio-substituted phenols, for example p-(dodecylthio) phenol; benzenethiols, for example octylbenzenethiol, p-nonylbenzenethiol, p-decylbenzenethiol and p-dodecylbenzenethiol and alkylanilines, for example p-octylaniline and p-dodecylaniline.

Aromatic amines which contain a fibre reactive group of formula V can be obtained by condensing a compound of formula II with the appropriate diamine under such conditions that only one of the two amino groups reacts with the compound of formula II. As specific examples of such diamines there may be mentioned 1,3-phenylenediamine-4-sulphonic acid, 1,4-phenylenediamine-2-sulphonic acid, 1,3-phenylenediamine -4,6-disulphonic acid, 1,4-phenylenediamine-2,5- disulphonic acid and 2,6-diaminonaphthalene-4,8-disulphonic acid.

The reactions leading to the formation of dyes of Formula I may be carried out using conditions that have been fully described in the prior art for such reactions.

The dyes of the present invention, optionally in the form of their water-soluble salts, particularly sodium salts, may be used for coloring cellulosic textile materials using methods that have been fully described in the prior art for the application of monohalogenotriazinyl and halogenopyrimidinyl dyes. They are particularly useful, however, for coloring textile materials based on natural or synthetic nitrogenous fibres, for example wool, silk and nylon.

The dyes are especially suitable for dyeing wool including wool which has been rendered non-felting or machine-washable by chemical processes such as acid chlorination, the use of hypochlorite under neutral or slightly alkaline conditions, the use of permonosulphuric acid, the use of the sodium salt of dichloroisocyanuric acid, and by the deposition of polymers on the surface of the wool using for example amine-epichlorohydrin resins. Material which has been so treated may be dyed by conventional wool dyeing methods, by the use of pad-batch dyeing methods, and also by continuous pad-steam processes. When applied to such fibres, the dyes have excellent fastness to wet treatments and to light.

The invention is illustrated but not limited by the following Examples in which all parts and percentages are by weight.

EXAMPLE 1

A solution of 12.9 parts of 1-(4,6-dichloro-s-triazinyl amino)-7-phenylazo-8-hydroxynaphthalene-3,6-disulphonic acid in 200 parts of water and 200 parts of acetone is added during 30 minutes to a solution of 2.6 parts of 4-nonyl phenol in 100 parts of acetone at 30° C. maintaining the pH of the reaction mixture between 8.5 and 9.0 by the addition of 8% sodium hydroxide solution. The reaction mixture is stirred under these conditions for a further 2 hours, the pH is adjusted to 7.0 and the product is filtered off, washed with water and dried.

When applied to wool from a neutral to weakly acid dyebath, the dyestuff yields a bright bluish-red shade having excellent fastness to wet treatments.

EXAMPLE 2

A solution of 12 parts of cyanuric chloride in 200 parts of acetone is added to 300 parts of water at 0°–5° C. A solution of 41.2 parts of 2-N-methylamino-6-(4'-methoxy)phenylazo-5-hydroxynaphthalene-2',7-disulphonic acid (68% strength) in 600 parts of water is added over 30 minutes at 0°–5° C. to the cyanuric chloride solution and the pH raised to 6.5 with 10% sodium carbonate solution. After stirring for a further 2 hours at 0°–5° C. and pH 6.5 a solution of 15.8 parts of 4-nonylphenol in 200 parts of acetone is added. The pH is raised to 9 and the reaction mixture is heated to 30° C. over 1 hour. Stirring is continued for a further 3 hours at 30° C. and pH 9 and the pH is then adjusted to pH 7 with hydrochloric acid. Sodium chloride (5% solution) is added and the product is filtered off, washed with 5% sodium chloride and dried at 40° C.

When applied to wool which has been rendered machine washable (e.g. Hercosett wool) from a weakly acid dyebath, the dyestuff yields a bright scarlet shade having excellent fastness to wet treatments and to light.

The following Table gives further examples of dyes of the invention which are obtained by diazotizing the aromatic amino listed in the first column, coupling on to the coupling component named in the second column, hydrolyzing the acetylamine group where appropriate, condensing first with the acid chloride listed in the third column and finally with the amine, phenol or thiol listed in the fourth column. The shade of the dyestuff when applied to wool or nylon is given in the final column.

| Example | I | II | III | IV | V |
| --- | --- | --- | --- | --- | --- |
| 3 | aniline | 1-acetylamino-8-naphthol-3,6-disulphonic acid | cyanuric chloride | 4-octylphenol | Bluish-red |
| 4 | " | " | " | 4-dodecylphenyl | " |
| 5 | " | " | " | 4-nonyloxyphenyl | " |
| 6 | " | " | " | 4-dodecylaniline | " |
| 7 | " | " | " | 4-nonylbenzenethiol | " |
| 8 | " | 1-acetylamino-8-naphthol-4,6-disulphonic acid | " | 4-nonylphenol | " |
| 9 | " | 1-acetylamino-8-naphthol-5,6-disulphonic acid | 2,4,6-trichloropyrimidine | " | " |
| 10 | " | " | 2,4,5,6-tetrachloropyrimidine | " | " |
| 11 | " | " | 2,4,6-trichloro-5-cyanuric chloride | 4-octylphenol | " |
| 12 | aniline-2-sulphonic acid | 2-amino-8-naphthol-6-sulphonic acid | " | 4-nonylphenol | Red |
| 13 | " | 2-acetylamino-5-naphthol-7-sulphonic acid | " | 4-octylphenol | Orange |
| 14 | " | " | " | 4-monylphenol | " |
| 15 | 4-methylaniline-2-sulphonic acid | 2-N-methylamino-8-naphthol-6-sulphonic acid | cyanuric chloride | 4-nonylphenol | Red |
| 16 | 4-methoxyaniline-2-sulphonic acid | " | " | " | " |
| 17 | aniline-2-sulphonic acid | 2-N-methyl-N-acetylamino-5-naphthol-7-sulphonic acid | " | 4-octylphenol | Orange |
| 18 | " | " | " | | |
| 4-dodecylaniline | | | | | |
| 19 | 4-methoxyaniline-2-sulphonic acid | 2-acetylamino-5-naphthol-7-sulphonic acid | " | 4-octylphenol | Scarlet |
| 20 | " | " | " | 4-dodecylphenol | " |
| 21 | " | " | " | 4-nonylphenol | " |
| 22 | " | 2-N-methyl-N-acetylamino-5-naphthol-7-sulphonic acid | " | 4-octylphenol | " |
| 23 | " | " | " | 4-dodecylphenol | " |
| 24 | " | " | " | 4-nonyloxyphenol | " |
| 25 | " | " | " | 4-dodecylaniline | " |
| 26 | " | " | " | 4-nonylbenzenethiol | " |

-continued

| Example | I | II | III | IV | V |
|---|---|---|---|---|---|
| 27 | 2-aminonaphthalene-4,8-disulphonic acid | 3-methylaniline | " | 4-nonylphenol | Reddish-yellow |
| 28 | " | " | " | 4-octyphenol | " |
| 29 | 2-aminonaphthalene-1,5-disulphonic acid | 3-ureidoaniline | cyanuric chloride | 4-nonylphenol | reddish-yellow |
| 30 | 4-amino-4'-nitrostilbene-2,2'-disulphonic acid | aniline | " | " | yellow |
| 31 | " | " | " | 4-octylphenol | " |
| 32 | " | 3-methylaniline | " | 4-nonylphenol | " |
| 33 | " | " | " | 4-dodecylphenol | " |
| 34 | aniline-2-sulphonic acid | 1-(4'-amino-3'-sulphophenyl)-3-carboxy-5-pyrazolone | " | 4-nonylphenol | greenish-yellow |
| 35 | aniline-2,5-disulphonic acid | 1-(4'-aminophenyl)-3-methyl-5-pyrazolone | " | " | " |
| 36 | aniline-2,4-disulphonic acid | " | " | " | " |
| 37 | 5-chloroaniline-2-sulphonic acid | 1-(4'-amino-3'-sulphophenyl)-3-methyl-5-pyrazolone | " | 4-octylphenol | " |
| 38 | 4-chloroaniline-2-sulphonic acid | 1-(3'-amino-4'-sulphophenyl)-3-carboxy-5-pyrazolone | " | " | " |

EXAMPLE 39

A solution of 4.7 parts of 1,3-phenylene diamine-4-sulphonic acid in 100 parts of water at pH 7.0 is added during 20 minutes at 0°–5° C. to a suspension prepared by dissolving 4.62 parts of cyanuric chloride in 15 parts of acetone and adding the resulting solution to 30 parts of water and 30 parts of ice. The mixture is stirred for 2 hours at 0°–5° C. maintaining the pH at 4–5 by addition of 10% sodium carbonate solution as required. 7.5 Parts of 36% hydrochloric acid are then added and the mixture diazotized by the addition of 1.7 parts of sodium nitrite in 11.5 parts of water. The diazo suspension is then added to a solution of 7.1 parts of 1-(4'-sulphophenyl) -3-carboxy-5-pyrazolone in 100 parts of water at 0°–5° C. and pH 9.0 and the mixture is stirred at 0°–5° C. for 2 hours maintaining the pH at 9.0 by addition of 10% sodium carbonate solution. A solution of 6.0 parts of 4-nonylphenol in 50 parts of acetone is then added to the dichlorotriazinyl azo dyestuff suspension and the temperature is raised to 30° C. The reaction mixture is stirred at 30° C. for 3 hours maintaining the pH at 9.0 by the addition of 10% sodium carbonate solution as required; the pH is then adjusted to between 6.5 and 7.0. The precipitated dyestuff is filtered off, washed with 5% sodium chloride solution and dried at 40° C.

When applied to wool which has been rendered machine washable (e.g. Hercosett Wool) from a weakly acid dye bath, the dyestuff yields a bright greenish yellow shade having excellent fastness to wet treatments and to light.

EXAMPLE 40

To the diazo suspension prepared as in Example 35 is added during 20 minutes at 0°–5° C. a solution of 6.2 parts of the sodium salt of 2-amino-8-hydroxynaphthalene-6-sulphonic acid in 100 parts of water. The pH is adjusted to 2–3 and the mixture is stirred at 0°–5° C. for a further 6 hours. The pH is then raised to 9 by the addition of 10% sodium carbonate solution and a solution of 6.0 parts of 4-nonylphenol in 50 parts of acetone is then added to the dichlorotriazinyl azo dyestuff suspension and the temperature raised to 30° C. The reaction mixture is stirred at 30° C. for a further 3 hours maintaining the pH at 9.0 by the addition of 10% sodium carbonate solution as required; the pH is then adjusted to between 6.5 and 7.0. Sodium chloride (5% solution) is then added and the precipitated dyestuff is filtered off, washed with 5% sodium chloride solution and dried at 40° C.

When applied to wool which has been rendered machine washable or to nylon 6 from a weakly acid bath, the dyestuff yields a bright red shade having excellent fastness to wet treatments and to light.

The following Table gives further examples of dyes of the invention prepared in a similar manner to Examples 39 and 40 by condensing the diamine named in the first column with one mole of the acid chloride compound named in the second column and diazotizing and coupling the resultant amino compound with the coupling component named in the third column followed by condensation with the amine, phenol or thiol named in the fourth column. The shade of the dyestuff when applied to wool or nylon is given in the final column.

| Example | I | II | III | IV | V |
|---|---|---|---|---|---|
| 41 | 1,3-phenylenediamine-4-sulphonic acid | cyanuric chloride | 1-(4'-sulphophenyl)-3-carboxy-5-pyrazolone | 4-octylphenol | Greenish-yellow |
| 42 | " | " | 1-(3'-sulphophenyl)-3-carboxy-5-pyrazolone | 4-nonylphenol | " |
| 43 | " | " | " | 4-nonylbenzenethiol | " |
| 44 | " | 2,4,6-trichloropyrimidine | 1-(4'-sulphophenyl)-3-carboxy-5-pyrazolone | 4-octylphenol | " |
| 45 | " | 2,4,5,6-tetrachloropyrimidine | " | " | " |
| 46 | " | 2,4,6-trichloro-5-cyanopyrimidine | " | " | " |

-continued

| Example | I | II | III | IV | V |
|---|---|---|---|---|---|
| 47 | " | cyanuric chloride | 1-(4'-sulphophenyl)-3-methyl-5-pyrazolone | 4-nonylphenol | " |
| 48 | " | " | 1-(2',5'-dichloro-4-sulphophenyl)-3-methyl-5-pyrazolone | " | " |
| 49 | " | " | " | " | " |
| 50 | 1,4-phenylenediamine-2-sulphonic acid | " | " | 4-dodecylaniline 4-nonylphenol | Reddish-yellow |
| 51 | 1,4-phenylenediamine-2-sulphonic acid | cyanuric chloride | 1-(4'-sulphophenyl)-3-carboxy-5-pyrazolone | 4-nonylphenol | Reddish-yellow |
| 52 | " | " | " | 4-octylphenol | " |
| 53 | 1,3-phenylenediamine-4,6-disulphonic acid | " | 1-phenyl-3-carboxy-5-pyrazolone | 4-nonylphenol | Greenish-yellow |
| 54 | " | " | 1-phenyl-3-methyl-5-pyrazolone | " | " |
| 55 | " | " | 1-(2'-chlorophenyl)-3-methyl-5-pyrazolone | 4-octylphenol | " |
| 56 | " | " | 1-phenyl-3-methyl-5-aminopyrazole | 4-nonylphenol | " |
| 57 | " | " | acetoacetanilide | " | " |
| 58 | 1,4-phenylenediamine-2,5-disulphonic acid | " | 1-phenyl-3-carboxy-5-pyrazolone | 4-dodecylphenol | Reddish-yellow |
| 59 | " | " | 1-(2'-chlorophenyl)-3-methyl-5-pyrazolone | 4-octylphenol | " |
| 60 | " | " | 1-phenyl-3-methyl-5-pyrazolone | 4-nonylphenol | " |
| 61 | 1,4-phenylenediamine-2,5-disulphonic acid | cyanuric chloride | N-benzyl-N-ethylaniline | 4-dodecylphenol | Orange |
| 62 | 1,3-phenylenediamine-4-sulphonic acid | " | 2-amino-8-hydroxy-naphthalene-6-sulphonic acid | 4-octylphenol | Red |
| 63 | " | " | " | 4-dodecylphenol | " |
| 64 | 1,4-phenylenediamine-2-sulphonic acid | " | " | 4-nonylphenol | Bluish-red |
| 65 | " | " | " | 4-octylphenol | " |
| 66 | " | " | " | 4-dodecylaniline | " |

I claim:
1. A water-soluble azo dye having the formula

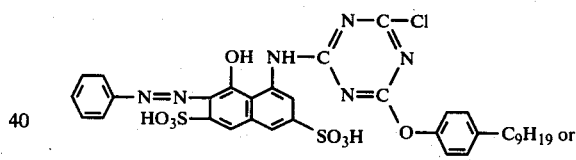

the sodium salt thereof.